United States Patent [19]

Scheuerle

[11] 3,933,215

[45] Jan. 20, 1976

[54] DIGITAL SYSTEM FOR CONTROLLING THE WHEELS OF A HEAVY-DUTY COMMERCIAL VEHICLE

[75] Inventor: Willy Scheuerle, Pfedelbach-Ohringen, Germany

[73] Assignee: Willy Scheuerle.Fahrzeugfabrik, Pfedelbach-Öhringen, Germany

[22] Filed: Aug. 15, 1974

[21] Appl. No.: 497,731

[30] Foreign Application Priority Data
Aug. 16, 1973   Germany............................ 2341442

[52] U.S. Cl............... 180/23; 180/79.1; 180/79.2 C
[51] Int. Cl.²......................................... B62D 61/10
[58] Field of Search.......... 180/23, 24, 79.1, 79.2 R, 180/79.2 C

[56] References Cited
UNITED STATES PATENTS

| | | | |
|---|---|---|---|
| 3,280,931 | 10/1966 | Cahill et al. ........................... | 180/23 |
| 3,387,684 | 6/1968 | Belke.................................. | 180/79.1 |

*Primary Examiner*—Leo Friaglia
*Assistant Examiner*—John A. Pekar
*Attorney, Agent, or Firm*—Michael J. Striker

[57] ABSTRACT

The angle each of a plurality of individually controllable wheels is to make with the lengthwise axis of a vehicle is controlled by a force responsive to the difference between a desired and actual position signal for each of the wheels, the former being furnished as a function of the angle of rotation of the steering wheel. The actual and desired position signals are furnished by code wheels coded in the absolute angle value of the desired or actual wheel position signals. In a first embodiment, the code wheels have a linear transfer characteristic. The control system includes a computer to convert one of the signals to a tangent or arctangent function and a comparator for comparing the converted signals to the other of the two sensed signals. In other embodiments either the code wheel furnishing the actual position signal has a tangent characteristic or that furnishing the desired position signal has an arctangent characteristic curve, thereby permitting direct comparison of the desired to the actual wheel position signals.

19 Claims, 13 Drawing Figures

DIGITAL SYSTEM FOR CONTROLLING THE WHEELS OF A HEAVY-DUTY COMMERCIAL VEHICLE

BACKGROUND OF THE INVENTION

This invention relates to a steering system for motor vehicles and in particular for heavy duty trucks having a plurality of controllable wheels or axles and wherein the steering of said wheels or axles takes place by comparison of a desired to an actual position signal and a force responsive to the difference therebetween to move the wheel to a position whereat the difference signal becomes zero.

Hydraulic steering systems of the above described type are known. The means for furnishing the desired and the actual position signals are mechanically or hydraulically coupled to a comparator. However, such steering systems do not work accurately and the different steering functions cannot readily be exchanged and require a relatively high amount of equipment. On the other hand heavy duty vehicles of the above described type require a rapid and manifold changes in the steering functions so that the vehicle can meet its requirements, that is, be steered in accordance with the curvature of the street in spite of its great length. For example the possibility must exist that the vehicle can be controlled selectively either to drive straight ahead, to drive around a curve or even to drive in a perpendicular direction to its lengthwise axis if required.

Further, it is of course required that the individually controlled wheels or axles all reach the required desired positions in the same time period since otherwise the progress of vehicle will not be smooth. The steering system must thus move the wheels (or the axles connected to the wheels) within the same time period through corresponding angles which, when the vehicle turns around a curve, will not be the same angle for each wheel. The different angles do not under such circumstances have a linear or proportional relationship to each other. Actually the angles of rotation are related by a tangent function while the vehicle is turning. This, of course, for equal time periods requires a tangent time function as well. Thus for each angle the associated time differential must be computed by means of a computer.

SUMMARY OF THE INVENTION

It is an object of the present invention to furnish a steering system which is suitable for heavy duty commercial vehicles such as trucks and which is a reliable and exact system for the simultaneous control of a plurality of wheels or axles. The system is to have the required elastic behavior and allow a rapid exchange of the steering systems.

In accordance with the present invention, either the means for furnishing the actual position signal or the means for furnishing the desired position signal; or both work in accordance with what will herein be referred to as an absolute digital system. In such a system each value of the code being used is associated with a definite angle of wheel rotation. Such an absolute system therefore is the opposite of an incremental system wherein the signals furnished correspond to angle increments which are later counted to derive a signal signifying the whole angle. Such an absolute system has the advantage that a particular angle of rotation corresponds to each coded value and that therefore a very exact and constant functional interconnection between the desired and the actual angle sensors is possible. Further, the different steering programs can be relatively simply exchanged against one another or, when suitably mounted within the vehicle, may be selectively switched in to the steering system.

Commercially available sensors generally have linear characteristic curves or relatively simple curves such as the sine or cosine curves. In a preferred embodiment of the present invention the first and second means, that is the means for furnishing the desired and the actual position signals respectively each have a linear characteristic curve. Under these conditions a computing device must be incorporated into the control system in order to convert at least one of the linear sensed signals into a tangent or arctangent function. Thus the embodiment which utilizes the simplest type of sensors, that is the linear sensors, requires the addition of a computer for computing the tangent or arctangent function.

Another possibility is to utilize either a first or a second means or both each of which have a characteristic curve which is nonlinear so that the desired and the actual position signals may be directly compared without further computation. In a preferred embodiment of the present invention either the first or the second means have a linear characteristic curve, the required relationship being achieved by the shaping of the curve of the other. The shaping of the characteristic curve can be achieved mechanically as for example by means of cams or special gearing or it can be achieved electromechanically as for example by means of code wheels which have the required nonlinear characteristic curve. Such digitally coded code wheels can readily be manufactured with a particular desired characteristic curve, that is a particular desired relationship between the measured angle of rotation and the output signal of the sensor.

By exchanging steering programs, a change in the steering can readily be achieved so that for example instead of driving the vehicle along a predetermined path, the vehicle may be turned around its center point or a point relatively close to said center point. Other programs may also be devised.

When said vehicle has a plurality of individually controllable axles all having a common center of rotation when turning a curve, either the computing means, or the one of the sensors which has the nonlinear characteristic, has a characteristic which follows a tangent or an arctangent curve.

In a preferred embodiment of the present invention the steering system comprises means for furnishing a desired position signal which are directly or indirectly coupled to the steering wheel as well as a plurality of means for furnishing actual position signals which furnish actual position signals corresponding to each of the individually controlled wheels or axles. In a particular preferred embodiment of the present invention the means for furnishing the actual position signals are directly mounted on the vertical trunnions of the controlled wheel or axle and are directly activated by the actual angular position of the wheel or axle relative to a particular axis of the vehicle or relative to the frame of the vehicle, the loading bridge, etc.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

A preferred embodiment of the present invention will now be described with reference to the drawing.

Figure 1:
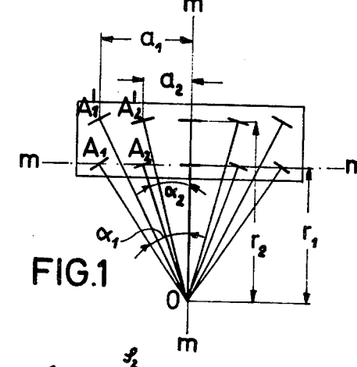
FIG. 1 shows a steering diagram for a multiple-axle vehicle driving along a predetermined path.

FIG. 1 illustrates the relationship between the different angles made by individually controllable wheels or axles of a motor vehicle when said motor vehicle is turning around a steering center of rotation marked 0. The number of such individually controlled wheel or axles may be equal to or exceed 100 in practice. In FIG. 1, the distance al, a2, etc., denotes the distance of the cneter of the respective control wheels from a perpendicular to the lengthwise axis of the vehicle which passes through point 0. This perpendicular is labled m—m in FIG. 1. The distances between a straight line parallel to the vehicle axis drawn through point o and the center of rotation of each individual wheel is labeled $r1$, $r2$, etc. Thus, as shown in FIG. 1, the angular position of the respective wheels (or axles) are given by the following tangent functions:

$$a_1/r_1 = \tang \alpha_1, \ a_2/r_1 = \tang \alpha_2, \text{ etc.}$$

Figure 2:
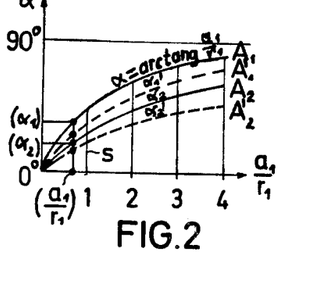
FIG. 2 is a graphic analysis of the diagram of FIG. 1.

In FIG. 2, the values of $a_1/r_1$ are entered on the abscissa while the angular wheel positions (or axle positions) of axles $A_1$, $A_1'$, $A_2$, $A_2'$, namely $\alpha_1$, $\alpha_1'$, $\alpha_2$, $\alpha_2'$ are entered in accordance with the corresponding steering radius $r_1$, that is in accordance with the smaller or larger distance between the steering center of rotation 0 and the lengthwise center line $m_1$—$m_1$ of axles $A_1$, $A_2$, etc. Lines parallel to the ordinate are lines connecting angular positions having the same steering center of rotation. For example line s connects points of angles $= \arctan a/r$ in dependence upon $a_1/r_1$ for which the individual axles are rotated by the following defined angles relative to the lengthwise axis of the vehicle:

$$\alpha_1 = \arctan a_1/r_1 \ \alpha_1' = \arctan a_1/r_2$$

$$\alpha_2 = \arctan a_2/r_1 \ \alpha_2' = \arctan a_1/r_2$$

As the distance $r_1$ between $m_1$—$m_1$ and point 0 increases, the angles approach the value of zero, while decreasing values of $r_1$ cause all angles to approach the value of 90°. The curves may finally extend into the negative region. Accordingly, the same program may be used to move point 0 at will along the m—m axis. That is the point may be moved to the center of the vehicle to permit turning of the vehicle around its center point or may be moved further to the opposite side of the vehicle.

Figure 3:
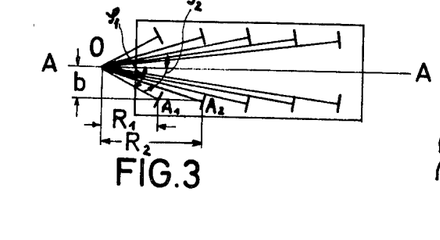
FIG. 3 is a steering diagram for a multiple-axle vehicle for turning said vehicle around a center of rotation situated along the lengthwise center axis of the vehicle.
Figure 3A:
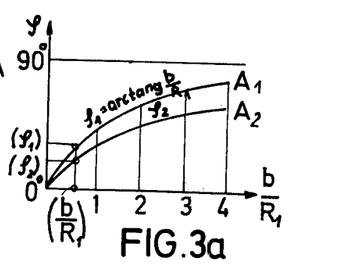
FIG. 3a is a graphic analysis of the steering diagram of FIG. 3.

FIG. 3 shows a further example for programming the steering function. In this example the steering center of rotation 0 lies along the lengthwise center axis A—A of the vehicle. The angle of rotation of the axles are again related to each other by an arctan function corresponding to $p = \arctan b/R$. If point 0 lies at infinity, the steering system is set for moving the vehicle in a direction perpendicular to its lengthwise axis and all axles are therefore perpendicular to the lengthwise center axis A—A of the vehicle, making angles $p$ equal to zero. If point 0 is moved along the A—A axis, the angles $p$ ($p_1$, $p_2$, etc.) increase one after the other to a value of 90° in accordance with the arctan function. FIG. 3a shows the plotted values of the various arctan functions with $b/R_1$ being entered on the abscissa, similarly as in FIG. 2. The perpendicular $b/R_1$ connects points signifying the angles under the condition of FIG. 3.

Figure 4:
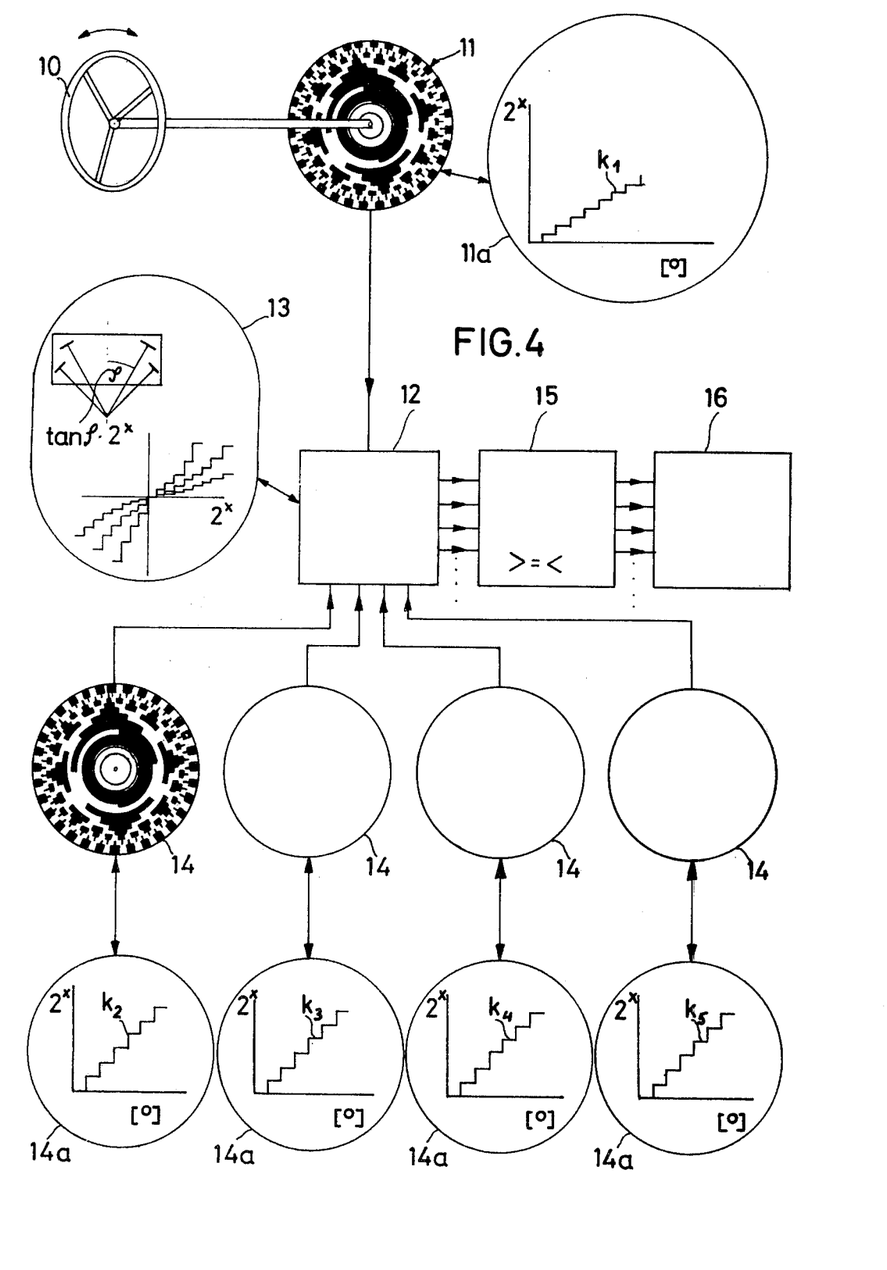
FIG. 4 is a schematic diagram illustrating a steering system having sensors with linear characteristic curves.

FIG. 4 shows a block diagram of steering in accordance with an absolute digital system. The steering wheel is indicated by reference numeral 10 and directly activates a code wheel 11 which is a wellknown electromechanical code wheel divided into conductive and nonconductive segments so that a set of brushes fixed in a stationary position will furnish currents varying as a function of the angular position of the wheel. This code wheel represents means for furnishing a desired position signal. When the code wheel has a linear characteristic curve $k_1$, as shown in diagram 11a, the binary number representing the desired position signal varies as a linear function of the angle of rotation of wheel 11.

The means for furnishing the actual position signals, (herein also referred to as the second means) are represented by code wheels 14. Again these are digital code wheels each having a linear characteristic curve $k_2$, $k_3$, $k_4$, $k_5$, etc. Since both the first and the second means have linear characteristic curves, a computing unit 13 is required in the system which converts either the linear characteristic curve of the desired or of the actual position signals to an arctan or a tangent function respectively. The various desired position signals corresponding to the indicated and possibly transformed angles which correspond to the desired position signal furnished by the steering wheel and code wheel 11 are then computed in accordance with the geometry of the vehicle by a function generator 12. A comparator 15 then compares the actual position signals to the desired position signals and the various difference signals then serve to control the individual wheels to the desired position, that is the position in which the corresponding difference signal approaches zero. The final power output stages which serve to so control the wheels are indicated schematically as unit 16.

Figure 5:
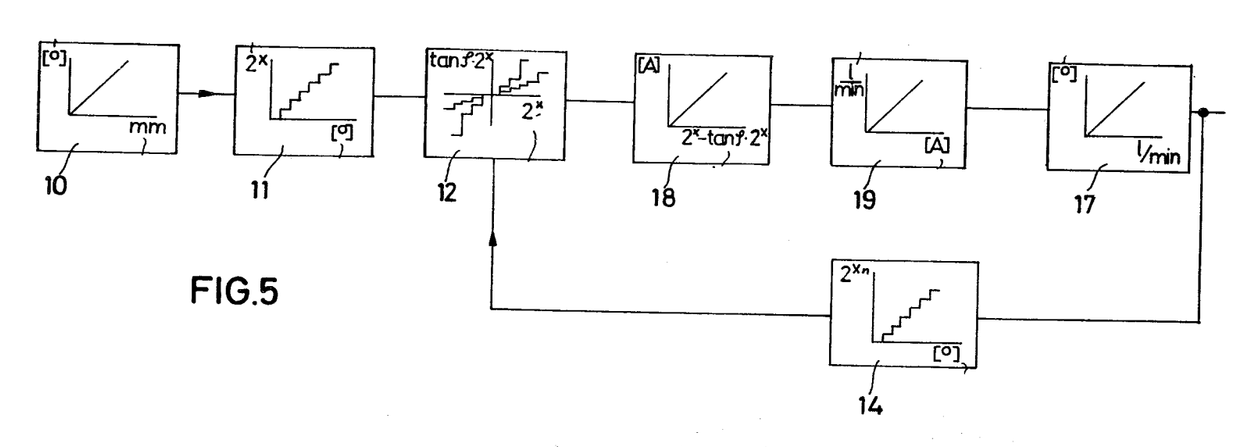
FIG. 5 is a block diagram of the steering system of FIG. 4.

In the block diagram of FIG. 5, the same units as shown in FIG. 4 have the same reference numerals. The sensors sensing the actual position of the wheels (second means) are either controlled directly by the angular wheel or axle position, or indirectly through a pivoting motor 17. The sensor 11, sensing the steering wheel angle (first means) are again assumed to have a linear characteristic as are the actual position sensors 14. The function generator 12 therefore furnishes a signal corresponding to the tangent of the angle sensed by sensor 14. The difference between this tangent value and the steering wheel angle furnished by sensor 11 is compared in a difference amplifier 18. The output of difference amplifier 18 controls the position of a control piston in a valve 19 which also has a linear characteristic curve. The position of the control piston of valve 19 then controls the action of a pivoting motor 17 which in turn is coupled to the wheel controlling the position thereof. Motor 17 is operative until the difference signal at the output of difference amplifier 18 becomes zero. (Pos.19 according with the prospect of Mrssr. Rexroth No.RD 29342 ).

Figure 6:
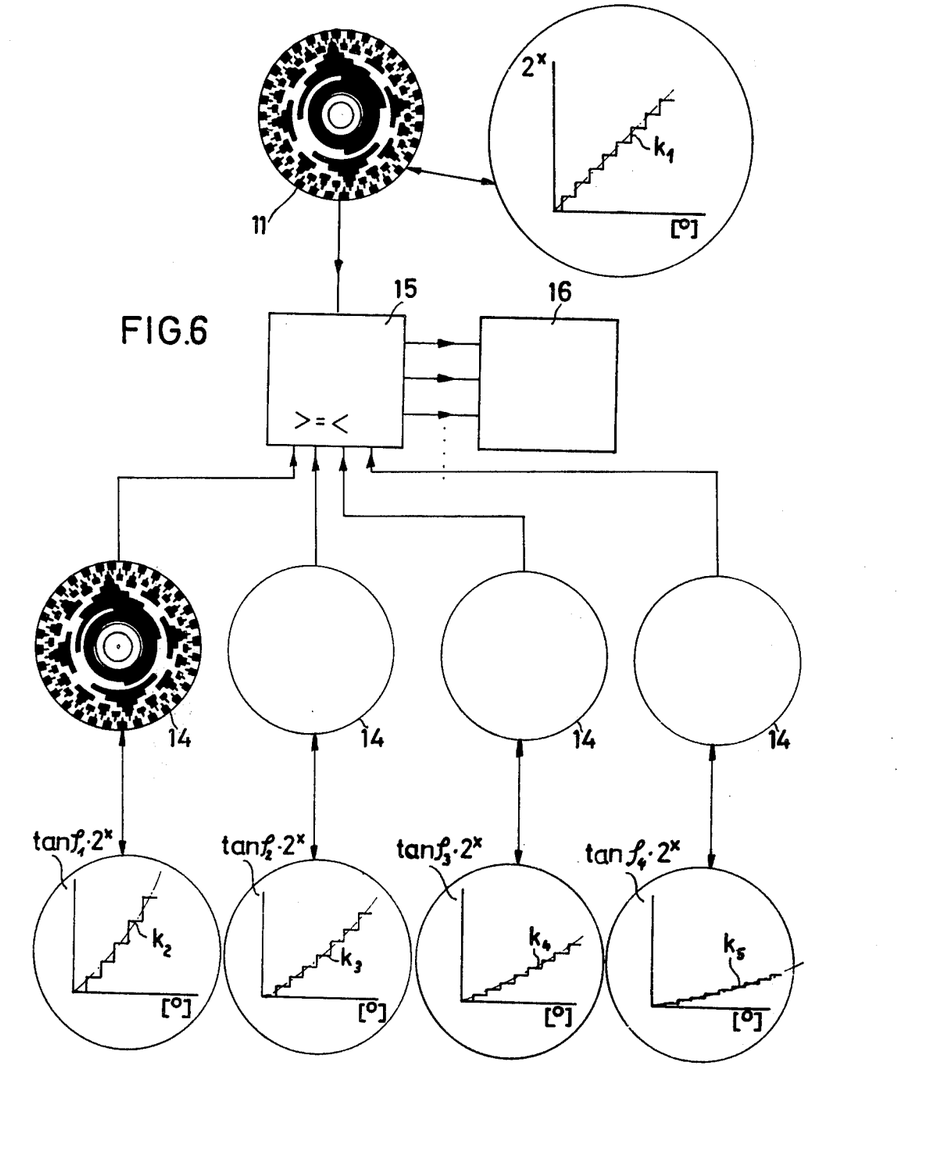
FIG. 6 is a schematic diagram of a steering system having actual position sensors with a tangent characteristic curve and a desired position sensor with a linear characteristic curve.

In the embodiment shown in FIG. 6, the first means, that is code wheel 11, again represents an element operative in accordance with the absolute digital system, that is a system wherein each signal derived by the brushes from the code wheel represents a determined angle of the steering wheel. The characteristic curve is again shown to be a linear curve. The means for furnishing the actual position signal, namely code wheels 14, have a tangent characteristic, the particular characteristic varying in dependence on the geometry of the vehicle. When code wheels 14 have this tangent characteristic, comparator 15 can directly compare the outputs of code wheels 11 and 14 thus obviating the need for a computing element. The various difference signals are then applied to output state 16 which controls the position of the wheels.

Figure 7:
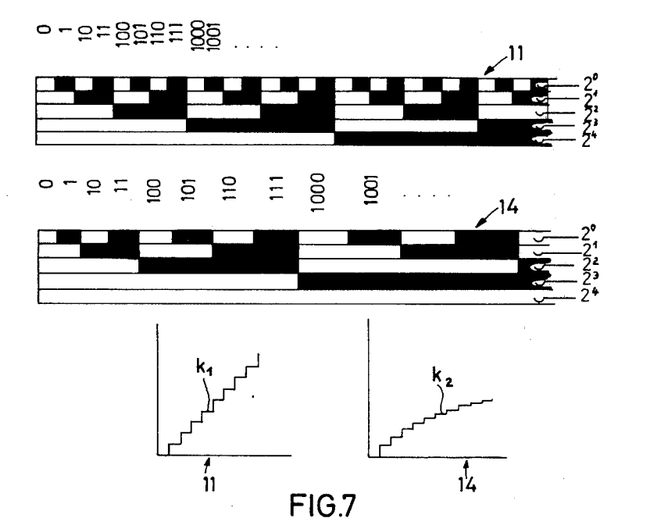
FIG. 7 shows embodiments of code wheels having linear and nonlinear characteristic curves.

FIG. 7 shows how the code wheels can be made to yield various types of characteristic curve or transfer functions. For simplicity, the code wheels are shown having the various tracks arranged in a lengthwise direction. Of course in actual practice to measure an angular position, these tracks would be concentric tracks. In any case, a set of brushes is arranged in a fixed position relative to the code wheels which turn with the wheels. Each of the brushes covers one of the tracks. As shown, the output of the top brush represents values of $2^0$, the next lower one $2^1$, etc. If the black sections are taken to be conductive while the white sections are taken to be nonconductive, each brush will furnish pulses when traveling over the conductive segment, the total signal furnished by the brushes being a signal in a binary coded form. The output of the brushes at the particular portions of the upper code wheel are indicated on top, number "100", for example, representing 0.4. The decimal numbers derived from the upper code wheel are shown in portion 11 of FIG. 7. The lower code wheel is arranged in accordance with a nonlinear scale. As shown in FIG. 7, the angular portions of the code wheel are lengthened as the angle of the code wheel progresses. The increase in the output of code wheel 11' is thus less than the linear characteristic shown in code wheel 11. The resulting characteristic curve is shown in portion 11' of FIG. 7. This is seen to follow an arctangent function. Characteristic 11', that is code wheel 11', would thus be useful if the actual position signals were furnished as linear functions of the actual wheel positions. In this case then use of the lower code wheel of FIG. 7 would permit a direct comparison obviating the need for a computing element in the control system.

Figure 8A:
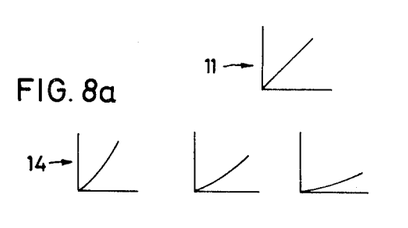
FIGS. 8a and 8b show examples of characteristic curves for the desired and actual position sensors.
Figure 8B:
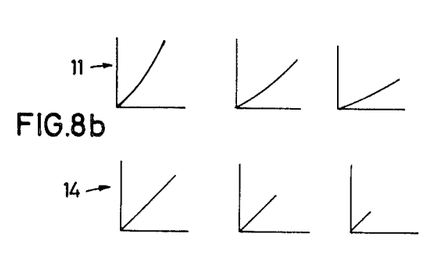

Of course various combinations of different characteristic curves are possible. These are illustrated in FIGS. 8a and 8b. In FIG. 8a the situation previously illustrated in FIG. 6 is shown. Specifically, the means furnishing a desired position signal (11) have a linear characteristic curve. The means furnishing the actual position signals (14) each have a nonlinear characteristic curve, the actual shape of the curve depending upon the geometry of the vehicle. In this particular embodiment, one desired position signal can be directly compared to a plurality of actual position signals, the number of difference amplifiers of course being equal to the number of actual position signals. The individual output element then controls each of the cntrollable wheels in accordance with the difference signal furnished by its associated difference amplifier.

In FIG. 8b the situation is somewhat different. The actual position signals, 14, each have the same linear characteristic curve. The desired position signal comprises a plurality of desired position signals, 11, each following an arctan function, but having different slopes depending upon the geometry of the vehicle. The desired position signals can, for example, be furnished by a plurality of code wheels all mounted on a shaft controlled by the steering wheel. Each actual position signal is then compared to the corresponding desired position signal and the difference therebetween again controls the position of the wheel until it is driven to zero. Thus each controllable wheel or axle here requires one code wheel for furnishing the actual and one code wheel for furnishing the desired position signal. A complete set of code wheels for furnishing the desired position signal may be switched relatively simply by means of a switch or lever available to the driver for another set so that a different steering program can readily be obtained. Further embodiments for furnishing the desired and actual position signals of course are also possible.

Figure 9:
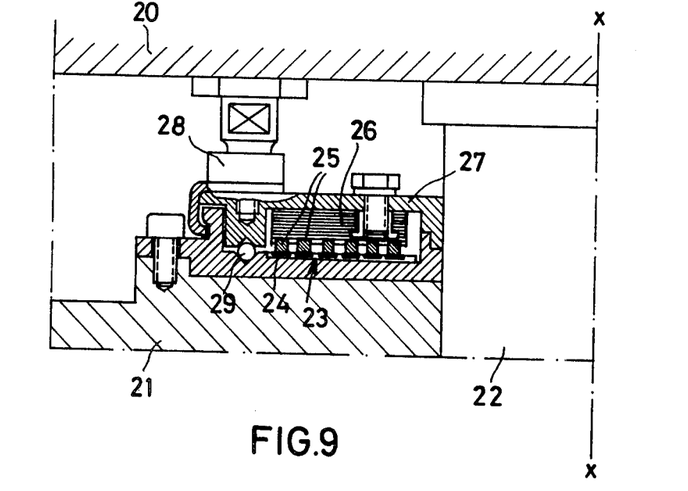
FIG. 9 is a partial section through the axle bearing of a controlled axle having an incorporated code wheel.

FIG. 9 shows a preferred embodiment for building in a code wheel at the trunnion of a commercial vehicle. The main body of the vehicle is represented by reference numeral 20 which may, for example, represent the loading bridge of a multiple axle heavy duty truck. Axle assembly 21 is rotatably mounted about axis $x-x$ by means of a trunnion 22. Code wheel 23 with electrically conductive segments 24 and pickup brushes 25 is mounted between axle assembly 21 and the main body 20. A brush assembly including the brush carrier 27 and brushes 25 as well as insulator 26 are coupled through a member 28 to the body 20 of the vehicle and are braced on the axle assembly by means of ball bearings 29 are equivalent.

For each relativee angle of rotation of axle assembly relative to body 20 around axis $x-x$, a set of pulses is furnished by brushes 25 which constitutes the actual position signal. Depending upon the characteristic curve of the code wheel, this value is furnished either directly to the comparator or first to a computer. It is of course desirable that these code wheels are mounted in such a manner that they may be readily exchanged or else may be selectively switched into the circuit.

Figure 10:
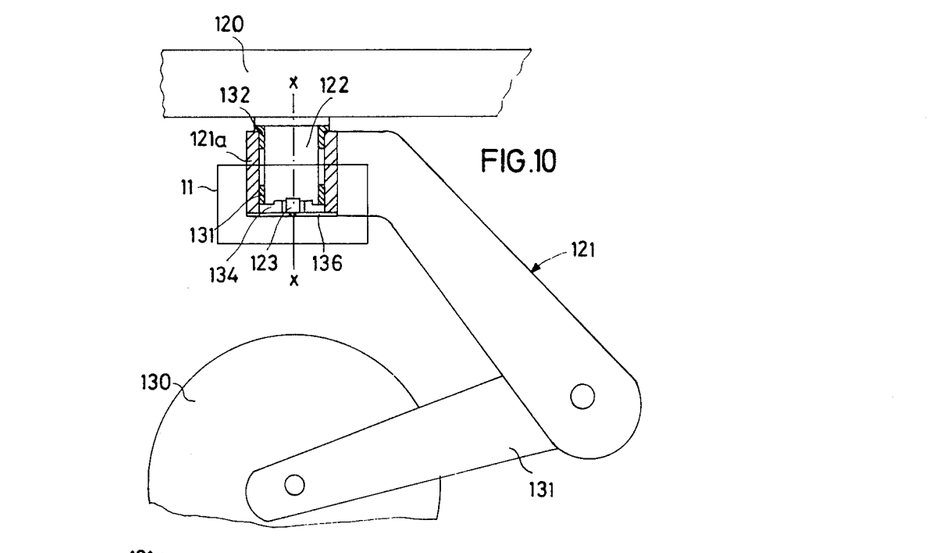
FIG. 10 is a schematic diagram showing an alternate method of incorporating the code wheel.
Figure 11:
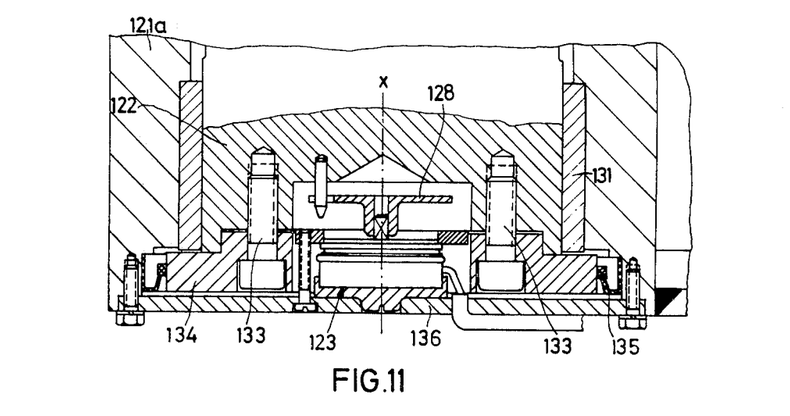
FIG. 11 is a more detailed diagram of part 11 of FIG. 10.

FIGS. 10 and 11 show another embodiment for incorporating a code wheel 123 (means for furnishing the actual position signal) into the trunnion bearing assembly of the axle assembly. As shown schematically in FIG. 10, axle 121 which controls a wheel or pair of wheels 130 by means of control lever 131 is pivotably mounted by means of trunnion 122 relative to body 120 of the vehicle. Wheel or wheels 130 are herein braced by means of a spring or hydraulically against axle 121 in a fashion which is not shown. Trunnion 122 is rigidly coupled to the main body 120 (for example a loading bridge of the vehicle. The body 120 in turn is braced through trunnion 122, a friction bearing 131 and a thrust bearing 132 on the driving collar of axle 121.

FIG. 11 shows a cutaway portion 11 of FIG. 10 in an enlarged scale. Screws 133 connect a plate 134 to trunnion 122. A seal 135 seals bearing 131 which is mounted on plate 134. The lower surface of trunnion 122 houses code wheel 123. A cover plate 136 which is screwed onto driving collar 121a of axle 121 encloses the space housing code wheel 123 and plate 134. Similarly, as in FIG. 9, one part of the means for furnishing the actual position signal are connected through cover plate 136 with axle 121 for rotation therewith, while the other portion, for example the brushes, are connected to a member 128 with the main body 120 of the vehicle. Of course the position of the code wheel and the brushes can be interchanged.

The above embodiment has the advantage that the means for furnishing the actual position signal are completely enclosed in the trunnion and are thus protected against damage. Since the cover plate 136 can be removed, access to the code wheels is still relatively simple and these code whells can be readily exchanged and incorporated. Further, play in the axle bearing cannot destroy the means for furnishing the actual position signal.

While the invention has been illustrated and described as embodied in specific code wheel arrangements, it is not intended to be limited to the details shown, since various modifications and circuit changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Steering system for a vehicle having a plurality of individually controllable wheels, comprising, in combination, first means for furnishing a desired angular position signal indicative of the desired angular position of said wheels relative to a determined axis of said vehicle; second means for furnishing actual position signals indicative of the actual position of said wheel relative to said determined axis, at least said first or said second means comprising means for furnishing a digital signal having a plurality of determined values each corresponding to one of a plurality of angular positions of said wheels relative to said determined axis; and control means connected to said first and second means and said wheels for adjusting the angular position of said wheels as a function of said desired and actual position signals, in such a manner that said angular position of said wheels varies as a predetermined non-linear function of said desired position signal.

2. Steering system for a vehicle having a plurality of individually controllable wheels, comprising, in combination, first means for furnishing a desired angular position signal varying as a linear function of the desired angular position of said wheels relative to a determined axis of said vehicle; second means for furnishing actual position signals varying as a linear function of the actual position of said wheel relative to said determined axis, at least said first or said second means comprising means for furnishing a digital signal having a plurality of determined values each corresponding to one of a plurality of angular positions of said wheels relative to said determined axis; and control means connected to said first and second means and said wheels for adjusting the angular position of said wheels as a function of said desired and actual position signals, said control means comprising computer means for computing a non-linear position signal varying as a predetermined non-linear function of said desired or said actual position signals, comparator means for comparing said non-linear position signal to the other of said desired and actual position signals and furnishing a difference signal corresponding to the difference therebetween, and output means connected to said comparator means for controlling said angular position of said wheels in such a manner that the amplitude of said difference signal decreases towards zero.

3. A system as set forth in claim 2, wherein said system comprises a system for steering said vehicle around a curve; wherein said vehicle has a plurality of individually controllable wheels all having a common center of rotation when said vehicle goes around a curve; and wherein said predetermined non-linear function of said desired or actual position signal is a tangent or arctangent function, respectively.

4. A system as set forth in claim 3, wherein said vehicle has a steering wheel; wherein said first means comprise means for furnishing said desired position signal as a function of the angular position of said steering wheel relative to a predetermined initial position; and wherein said second means comprise a plurality of second means corresponding in number to said plurality of individually controllable wheels, each for furnishing an actual position signal corresponding to the actual position of the corresponding one of said wheels.

5. A system as set forth in claim 4, wherein said first means comprise a code wheel.

6. A system as set forth in claim 4, wherein each of said second means comprises a code wheel.

7. A system as set forth in claim 4, wherein said vehicle has a plurality of trunnions and coupling means for coupling each of said individually controllable wheels to a corresponding one of said trunnions for rotation therewith; and wherein each of said second means comprise means mounted on a corresponding one of said trunnions for furnishing an actual position signal indicative of the angle of rotation of said trunnion relative to a predetermined axis in the body of said vehicle.

8. A system as set forth in claim 7, wherein said vehicle further comprises a supporting disc; wherein the body of said vehicle is braced against said supporting disc; wherein said vehicle further comprises a thrust bearing bracing said supporting disc against said coupling means; and wherein said second means comprise a code wheel mounted in a ring-shaped section between said trunnion and said thrust bearing.

9. A system as set forth in claim 7, wherein said second means each comprises a code wheel mounted in an enclosed space in one of said trunnions.

10. A system as set forth in claim 7, wherein each of said code wheels is removably mounted in a space in one of said trunnions; further comprising a removable cover plate for covering said space containing said second means.

11. Steering system for a vehicle having a plurality of individually controllable wheels, comprising, in combination, first means for furnishing a desired angular position signal indicative of the desired angular position of said wheels relative to a determined axis of said vehicle; second means for furnishing actual position signals indicative of the actual position of said wheel relative to said determined axis, at least said first or said second means comprising means for furnishing a digital signal having a plurality of determined values each corresponding to one of a plurality of angular positions of said wheels relative to said determined axis, at least said first or said second means having a non-linear transfer characteristic whereby said desired or said actual position signal varies as a predetermined nonlinear function of said desired or actual position of said wheels respectively; and control means connected to said first and second means and said wheels for adjusting the angular position of said wheels as a function of said desired and actual position signals, said control means comprising comparator means for directly comparing the so-furnished actual and desired position signals and furnishing a difference signal corresponding to the difference therebetween, and output means connected to said comparator means for controlling said angular position of said wheels in such a manner that the amplitude of said difference signal decreases towards zero.

12. A system as set forth in claim 1, wherein said system comprises a system for steering said vehicle around a curve; wherein said vehicle has a plurality of individually controllable wheels all having a common center of rotation when said vehicle goes around a curve; and wherein said predetermined nonlinear function of said desired or actual position signal is a tangent or arctangent function, respectively.

13. A system as set forth in claim 12, wherein said vehicle has a steering wheel; wherein said first means comprise means for furnishing said desired position signal as a function of the angular position of said steering wheel relative to a predetermined initial position; and wherein said second means comprise a plurality of second means corresponding in number to said plurality of individually controllable wheels, each for furnishing an actual position signal corresponding to the actual position of the corresponding one of said wheels.

14. A system as set forth in claim 13, wherein said first means comprise a code wheel.

15. A system as set forth in claim 13, wherein each of said second means comprise a code wheel.

16. A system as set forth in claim 13, wherein said vehicle has a plurality of trunnions and coupling means for coupling each of said individually controllable wheels to a corresponding one of said trunnions for rotation therewith; and wherein each of said second means comprise means mounted on a corresponding one of said trunnions for furnishing an actual position signal indicative of the angle of rotation of said trunnion relative to a predetermined axis in the body of said vehicle.

17. A system as set forth in claim 16, wherein said vehicle further comprises a supporting disc; wherein the body of said vehicle is braced against said supporting disc; wherein said vehicle further comprises a thrust bearing bracing said supporting disc against said coupling means; and wherein said second means comprise a code wheel mounted in a ring-shaped section between said trunnion and said thrust bearing.

18. A system as set forth in claim 16, wherein said second means each comprises a code wheel mounted in an enclosed space in one of said trunnions.

19. A system as set forth in claim 18 wherein each of said code wheels is removably mounted in a space in one of said trunnions; further comprising a removable cover plate for covering said space containing said second means.

* * * * *